(12) United States Patent
John et al.

(10) Patent No.: US 9,341,113 B2
(45) Date of Patent: May 17, 2016

(54) ATOMIZING AIR HEAT EXCHANGE FOR HEATING ATTEMPERATION FEED WATER IN A COMBINED CYCLE TURBINE

(71) Applicant: General Electric Company, Schenectady, NY (US)

(72) Inventors: Joseph John, Bangalore (IN); Raub Warfield Smith, Ballston Lake, NY (US); Bhaskar Pemmi, Bangalore (IN); Veerappan Muthaiah, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 758 days.

(21) Appl. No.: 13/658,394

(22) Filed: Oct. 23, 2012

(65) Prior Publication Data

US 2014/0110092 A1 Apr. 24, 2014

(51) Int. Cl.
*F02C 7/141* (2006.01)
*F02C 3/30* (2006.01)
*F01K 23/10* (2006.01)
*F02C 7/14* (2006.01)
*F02C 7/18* (2006.01)
*F02C 7/236* (2006.01)

(52) U.S. Cl.
CPC . *F02C 3/30* (2013.01); *F01K 23/10* (2013.01); *F02C 7/14* (2013.01); *F02C 7/141* (2013.01); *F02C 7/185* (2013.01); *F02C 7/2365* (2013.01); *F05D 2260/20* (2013.01); *F05D 2260/2322* (2013.01); *Y02E 20/16* (2013.01)

(58) Field of Classification Search
CPC .. F01K 23/10; F01K 23/08; F02C 6/18;F02C 7/14; F02C 7/141; F02C 7/16; F02C 7/2365; Y02E 20/16; F22B 1/1815; F05D 2260/20; F05D 2260/2322
See application file for complete search history.

(56) References Cited

U.S. PATENT DOCUMENTS

| | | | |
|---|---|---|---|
| 3,688,497 A | 9/1972 | Bracken, Jr. et al. | |
| 4,208,882 A | 6/1980 | Lopes et al. | |
| 4,391,101 A | 7/1983 | Labbe et al. | |
| 5,428,950 A * | 7/1995 | Tomlinson et al. | 60/783 |
| 5,628,179 A | 5/1997 | Tomlinson | |
| RE36,524 E | 1/2000 | Tomlinson | |
| 6,145,294 A | 11/2000 | Traver et al. | |
| 6,145,318 A * | 11/2000 | Kaplan et al. | 60/728 |
| 6,220,013 B1 * | 4/2001 | Smith | 60/783 |
| 6,422,022 B2 | 7/2002 | Gorman et al. | |
| 7,793,501 B2 | 9/2010 | Narayanaswamy et al. | |
| 8,209,951 B2 | 7/2012 | Hibshman, II | |
| 2009/0158738 A1* | 6/2009 | Hu et al. | 60/646 |
| 2010/0077970 A1 | 4/2010 | Kumar et al. | |
| 2010/0162721 A1* | 7/2010 | Welch et al. | 60/778 |

(Continued)

*Primary Examiner* — Phutthiwat Wongwian
*Assistant Examiner* — Marc Amar
(74) *Attorney, Agent, or Firm* — Nixon & Vanderhye P.C.

(57) ABSTRACT

An attemperation system and an atomizing air system are integrated for a combined cycle turbine including a gas turbine and a steam turbine. The atomizing air system receives compressor discharge air for fuel atomization. The atomizing air system includes an atomizing air cooler that serves to cool the compressor discharge air. A heat recovery steam generator receives exhaust from the gas turbine and generates steam for input to the steam turbine via an attemperation system. A feed water circuit draws feed water from the heat recovery steam generator and communicates in a heat exchange relationship with the atomizing air cooler to heat the feed water. The feed water circuit communicates the heated feed water to the attemperation system of the heat recovery steam generator.

9 Claims, 2 Drawing Sheets

(56) References Cited

U.S. PATENT DOCUMENTS

| | | |
|---|---|---|
| 2010/0205967 A1* | 8/2010 | Gopalkrishna et al. ......... 60/660 |
| 2010/0242430 A1* | 9/2010 | Hu et al. .................... 60/39.182 |
| 2010/0263605 A1* | 10/2010 | Sengar et al. ................. 122/31.1 |
| 2010/0287943 A1* | 11/2010 | McMahan et al. .............. 60/772 |
| 2012/0055166 A1* | 3/2012 | John et al. ....................... 60/772 |

* cited by examiner

ATOMIZING AIR HEAT EXCHANGE FOR HEATING ATTEMPERATION FEED WATER IN A COMBINED CYCLE TURBINE

BACKGROUND OF THE INVENTION

The invention relates to improving the power output in a combined cycle turbine system and, more particularly, to utilization of atomizing air heat rejection by integrating with the bottoming cycle for improving the power output of the combined cycle.

In a typical combined cycle system, a gas turbine combusts a fuel/air mixture which expands to turn the turbine and drive a generator for the production of electricity. The hot gases of combustion exhaust into a heat recovery steam generator in which water is converted to steam in the manner of a boiler. Steam thus produced drives a steam turbine, typically comprising high, intermediate and low pressure turbines, in which additional work is extracted to drive a further load such as a second generator for producing additional electric power. In some configurations, the gas and steam turbines drive a common generator and, in others, drive different generators.

Liquid fuel machines use a portion of compressor discharge air for atomization. The compressor discharge air (CPD) is cooled, moisture separated and supplied to the atomizing air (AA) compressor. The high pressure air from the AA compressor is used for atomization of liquid fuel for efficient combustion. The CPD air is cooled by rejecting heat to closed cooling water in a heat exchanger. It would be desirable to use this rejected heat more efficiently.

BRIEF DESCRIPTION OF THE INVENTION

In an exemplary embodiment, an attemperation system and an atomizing air system are integrated for a combined cycle turbine including a gas turbine and a steam turbine. The atomizing air system receives compressor discharge air for fuel atomization. The atomizing air system includes an atomizing air cooler that serves to cool the compressor discharge air. A heat recovery steam generator receives exhaust from the gas turbine and generates steam for input to the steam turbine via an attemperation system, which controls a temperature of the steam. A feed water circuit draws feed water from the heat recovery steam generator and communicates in a heat exchange relationship with the atomizing air cooler to heat the feed water. The feed water circuit communicates the heated feed water to the attemperation system of the heat recovery steam generator.

In another exemplary embodiment, a feed water circuit for attemperation in a heat recovery steam generator via an atomizing air system includes a feed water extraction line communicating feed water from the heat recovery steam generator; a feed water inlet line in series with the feed water extraction line and communicating the feed water to an atomizing air cooler of the atomizing air system; a heat exchange line in series with the feed water inlet line and disposed in a heat exchange relationship with the atomizing air cooler; and an attemperation line in series with the heat exchange line and communicating heated feed water from the heat exchange line to an attemperation inlet in the heat recovery steam generator.

In still another exemplary embodiment, a method of attemperating steam using an integrated attemperation and atomizing air system for a combined cycle turbine includes the steps of receiving compressor discharge air in the atomizing air system for fuel atomization, the atomizing air system including an atomizing air cooler that serves to cool the compressor discharge air; receiving, in a heat recovery steam generator, exhaust from the gas turbine and generating steam for input to the steam turbine; drawing feed water from the heat recovery steam generator and heating the feed water by communicating in a heat exchange relationship with the atomizing air cooler; communicating the heated feed water to an attemperation system of the heat recovery steam generator; and controlling a temperature of the steam by the attemperation system.

DETAILED DESCRIPTION OF THE INVENTION

Figure 1:
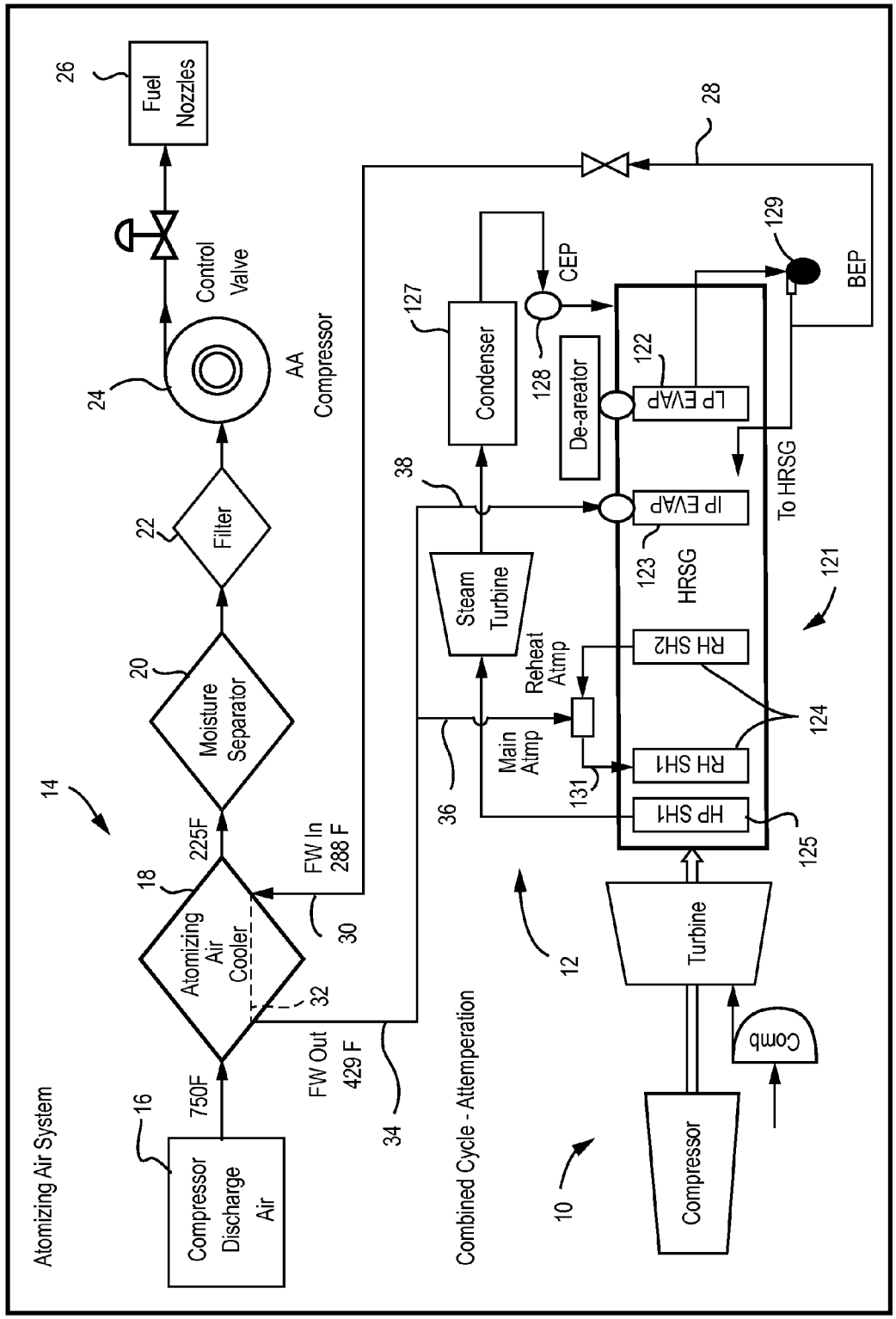
FIG. 1 is a schematic illustration of an integrated attemperation and atomizing air system and feed water circuit of a first embodiment.

FIG. 1 shows an integrated attemperation and atomizing air system in a combined cycle turbine including a gas turbine 10 and a steam turbine 12. The numbers followed by 'F' in the drawings refer to fluid temperatures in degrees Fahrenheit (° F.). Typical liquid fuel machines use a portion of compressor discharge air from the gas turbine for atomization. In an atomizing air system 14, a portion of the compressor discharge air 16 is directed to an atomizing air cooler 18. In a conventional atomizing air system, the atomizing air cooler 18 cools the discharge air via a heat exchange relationship with a cooling tower or the like. Moisture is separated from the cooled air via a moisture separator 20 and is filtered by a filter 22 before being directed to an atomizing air compressor 24. The cooled, dry and filtered air is used for atomization of liquid fuel in the gas turbine fuel nozzles 26.

Hot gases of combustion from the gas turbine 10 exhaust into a heat recovery steam generator (HRSG) 121 in which water is converted to steam which drives the steam turbine 12. The HRSG 121 typically includes a low pressure section, an intermediate pressure section, and a high pressure section, respectively including evaporators and/or superheaters such as low pressure evaporator 122, intermediate pressure evaporator 123, reheat superheaters 124, high pressure superheater 125, etc. As shown in FIG. 1, steam via the high pressure superheater 125 drives the steam turbine and is exhausted via a condenser 127. Superheated steam leaving the HRSG is conventionally controlled (and cooled) by injection of a water spray in a steam attemperator 131 generally located upstream of the final superheater passes.

The integrated attemperation and atomizing air system of the described embodiments efficiently utilizes heat rejected by the atomizing air cooler 18 by heating condensate water from the HRSG 121 of the steam turbine 12. In the embodiment shown in FIG. 1, LP water from LP pump discharge via the LP evaporator 122 can be directed via a suitable pump 129 and a feed water circuit to the atomizing air cooler 18 of the atomizing air system 14 in a heat exchange relationship. The heat being rejected by the atomizing air cooler 18 to cool the compressor discharge air can be used to heat the feed water for main/reheat attemperation.

At base load, the main and reheat attemperation flows may be 4500 pph and 1500 pph, respectively. This flow will go higher during part load operations. The required amount of heated condensate can be used for attemperation, and excess can be dumped to the IP evaporator 123 or the LP evaporator 122. In an exemplary construction, the LP water can be heated to about 430° F., which can be used to control a temperature of the steam via attemperation.

With continued reference to FIG. 1, the feed water circuit for attemperation in the HRSG 121 includes a feed water extraction line 28 that communicates the feed water from the HRSG 121. A feed water inlet line 30 is provided in series with the feed water extraction line 28 and communicates the feed water to the atomizing air cooler 18 of the atomizing air system 14. A heat exchange line 32 is in series with the feed water inlet line 30 and is disposed in a heat exchange relationship with the atomizing air cooler 18. An attemperation line 34 in series with the heat exchange line 32 communicates heated feed water from the heat exchange line 32 to an attemperation inlet 36 in the HRSG 121. The circuit may additionally include an excess line 38 parallel to the attemperation line 36 that directs excess heated feed water to the intermediate pressure section or the low pressure section of the HRSG 121.

Figure 2:
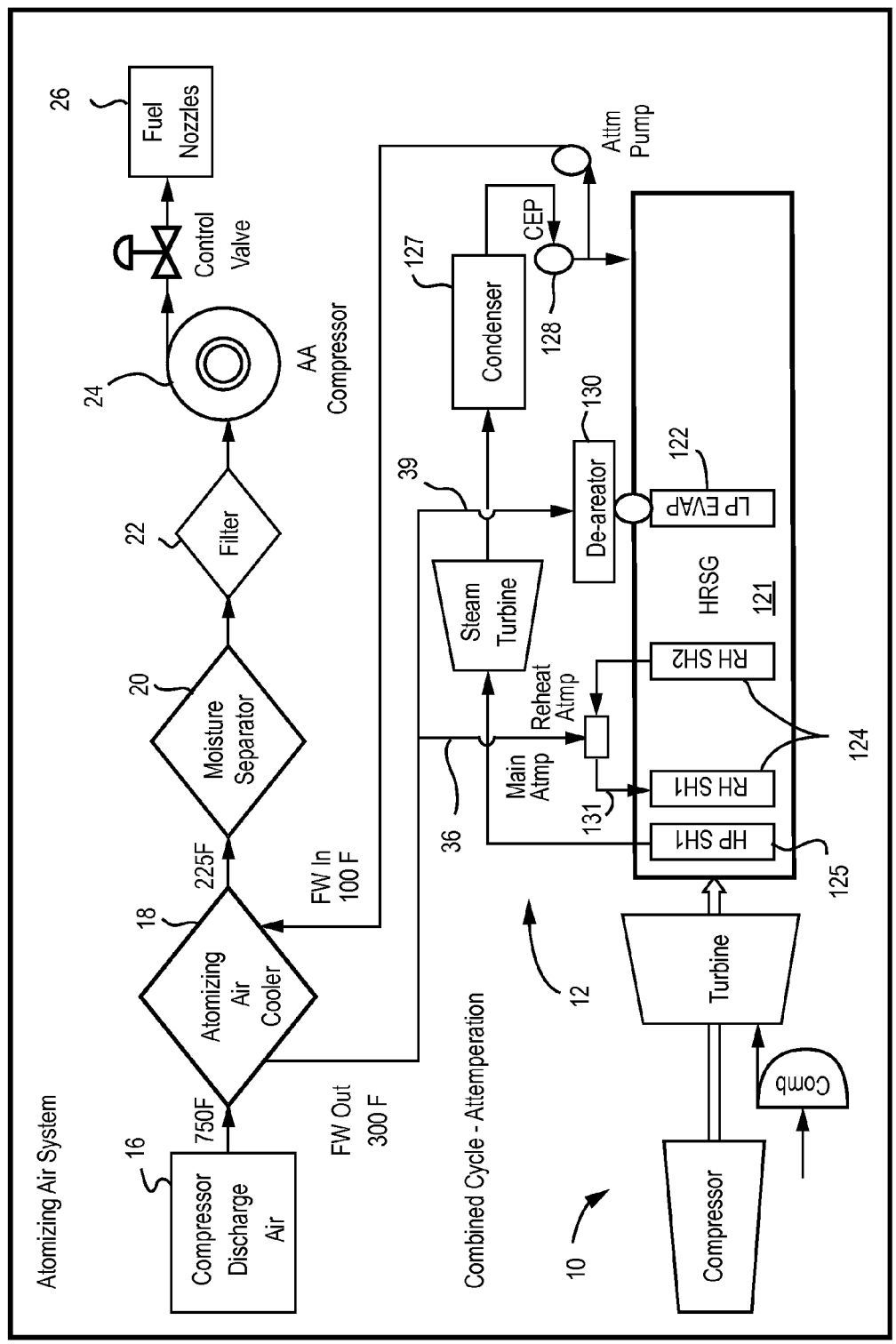
FIG. 2 is a schematic illustration of an integrated attemperation and atomizing air system and feed water circuit of a second embodiment.

FIG. 2 shows an alternative embodiment of the integrated attemperation and atomizing air system. In this embodiment, condensate water from the HRSG 121 comprises CEP 128 discharge, rather than feed water from the LP evaporator 122. In an exemplary construction, the condensate water from the CEP discharge is typically at 100° F. and can be heated to about 300° F. using the compressor discharge air 16 via the atomizing air cooler 18. As shown, the CEP 128 acts between the condenser 127 and the atomizing air cooler 18. An excess line 39 parallel to the attemperation line 36 directs excess heated feed water to the low pressure evaporator 122 via a de-aerator 130.

The structure of the described embodiments avoids the use of flue gas heat for attemperation, rather more efficiently using atomizing air heat. As a consequence, bottoming cycle efficiency is increased, thereby improving the power output of the combined cycle. In an exemplary construction, the power output was increased by 400 kW at base load.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An integrated attemperation and atomizing air system for a combined cycle turbine including a gas turbine and a steam turbine, the system comprising:
   an atomizing air system that receives compressor discharge air for fuel atomization, the atomizing air system including an atomizing air cooler that serves to cool the compressor discharge air;
   a heat recovery steam generator receiving exhaust from the gas turbine and generating steam for input to the steam turbine via an attemperation system that controls a temperature of the steam; and
   a feed water circuit that draws feed water from the heat recovery steam generator and communicates in a heat exchange relationship with the atomizing air cooler to heat the feed water while cooling the compressor discharge air through the atomizing air cooler, the feed water circuit communicating the heated feed water to the attemperation system of the heat recovery steam generator,
   wherein exhaust from the steam turbine is communicated to a condenser, and wherein the feed water circuit draws the feed water from condenser output via a line extending from the condenser output to the air cooler bypassing the heat recovery steam generator.

2. An integrated attemperation and atomizing air system according to claim 1, further comprising a pump interposed between the condenser and the atomizing air cooler, the pump increasing a pressure of the feed water.

3. An integrated attemperation and atomizing air system according to claim 1, wherein the feed water circuit comprises an excess line that directs excess heated feed water to the intermediate pressure section or the low pressure section of the heat recovery steam generator.

4. An integrated attemperation and atomizing air system according to claim 1, further comprising a condensate extraction pump acting between the condenser and the atomizing air cooler.

5. A feed water circuit for attemperation in a heat recovery steam generator via an atomizing air system, the feed water circuit comprising:
   a feed water extraction line communicating feed water to a feed water inlet line in series with the feed water extraction line, the feed water inlet line communicating the feed water to an atomizing air cooler of the atomizing air system;
   a heat exchange line in series with the feed water inlet line and disposed in a heat exchange relationship with the atomizing air cooler, the heat exchange line raising a temperature of the feed water; and
   an attemperation line in series with the heat exchange line and communicating heated feed water from the heat exchange line to an attemperation inlet in the heat recovery steam generator,
   wherein a steam turbine receives steam from the heat recovery steam generator, wherein exhaust from the steam turbine is communicated to a condenser, and wherein the feed water extraction line draws the feed water from condenser output via a line extending from the condenser output to the atomizing air cooler bypassing the heat recovery steam generator.

6. A feed water circuit according to claim 5, further comprising a pump interposed between the condenser and the atomizing air cooler, the pump increasing a pressure of the feed water.

7. A feed water circuit according to claim 5, further comprising an excess line parallel to the attemperation line that directs excess heated feed water to the intermediate pressure section or the low pressure section of the heat recovery steam generator.

8. A feed water circuit according to claim 5, further comprising a condensate extraction pump acting between the condenser and the atomizing air cooler.

9. A method of attemperating steam using an integrated attemperation and atomizing air system for a combined cycle turbine including a gas turbine and a steam turbine, the method comprising:
   receiving compressor discharge air in the integrated attemperation and atomizing air system for fuel atomization, the integrated attemperation and atomizing air system including an atomizing air cooler that serves to cool the compressor discharge air;
   receiving in a heat recovery steam generator exhaust from the gas turbine and generating steam for input to the steam turbine;
   communicating exhaust from the steam turbine to a condenser;
   drawing feed water from an output of the condenser via a line extending from the condenser output to the atomizing air cooler bypassing the heat recovery steam generator and heating the feed water while cooling the compressor discharge air by communicating in a heat exchange relationship with the atomizing air cooler;
communicating the heated feed water to an attemperation system of the heat recovery steam generator; and
controlling a temperature of the steam by the attemperation system.

\* \* \* \* \*